UNITED STATES PATENT OFFICE.

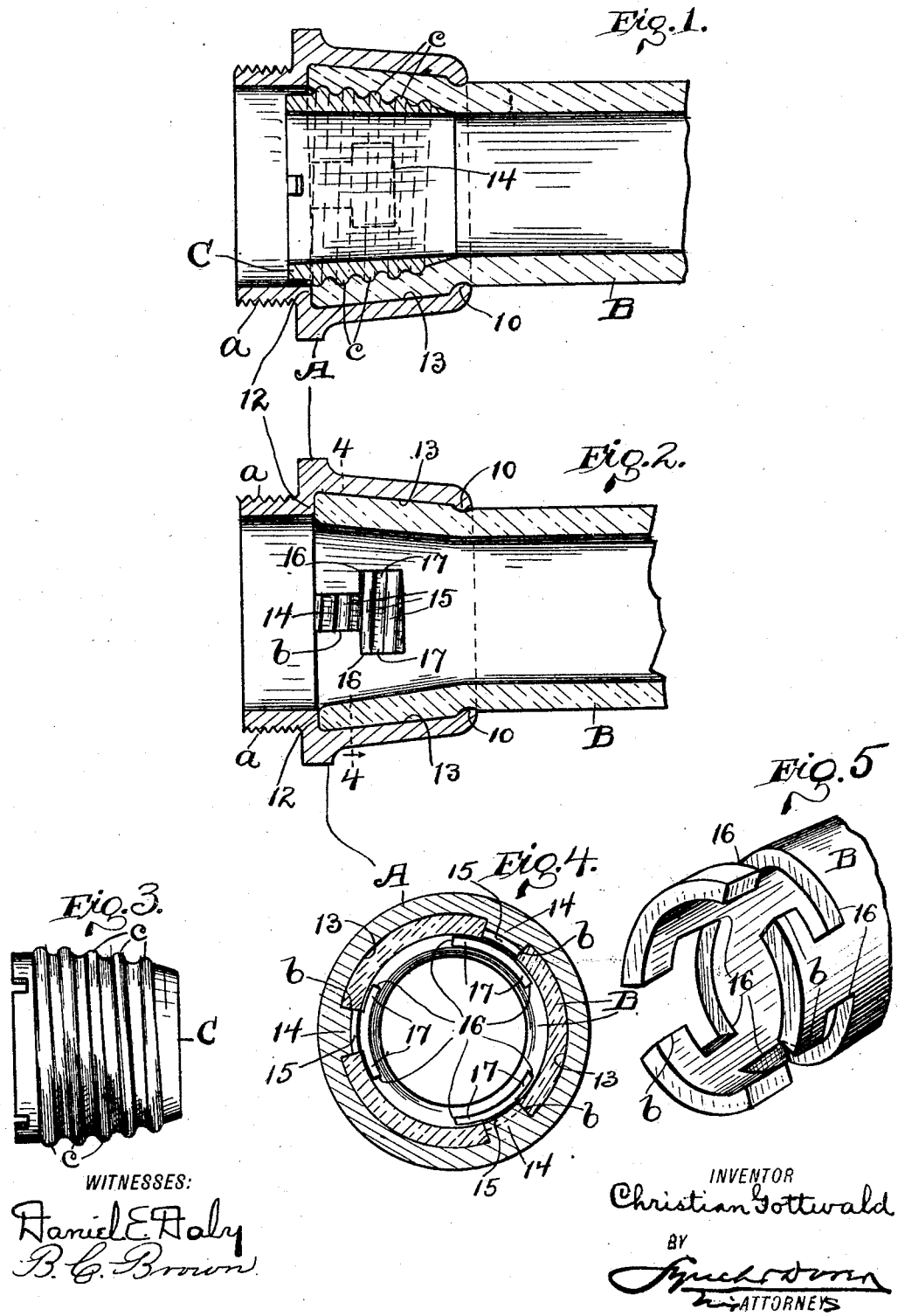

CHRISTIAN GOTTWALD, OF CLEVELAND, OHIO, ASSIGNOR OF ONE-HALF TO JOSEPH A. DIEHL, OF CLEVELAND, OHIO.

HOSE-COUPLING.

No. 795,796.      Specification of Letters Patent.      Patented July 25, 1905.

Application filed December 27, 1904. Serial No. 238,384.

*To all whom it may concern:*

Be it known that I, CHRISTIAN GOTTWALD, a citizen of the United States of America, residing at Cleveland, in the county of Cuyahoga and State of Ohio, have invented certain new and useful Improvements in Hose-Couplings; and I hereby declare the following to be a full, clear, and exact description of the invention, such as will enable others skilled in the art to which it pertains to make and use the same.

This invention relates to improvements in hose-couplings, and pertains more especially to improved means of attaching a hose to a hose-coupling.

The object of this invention is to so attach the hose to the hose-coupling that a fluid-tight joint between the hose and the hose-coupling is not only established, but loosening of the hose relative to the coupling is positively prevented.

Another object of this invention is not only to provide efficient but simple and inexpensive means for attaching the hose to the hose-coupling.

With these objects in view this invention consists in certain features of construction and combinations of parts hereinafter described, and pointed out in the claims.

In the accompanying drawings, Figure 1 is a side elevation, in central longitudinal section, of one of the companion parts or members of the hose-coupling and a hose embraced by and secured to the coupling member. Fig. 2 is a side elevation, in central longitudinal section, corresponding with Fig. 1 except that in Fig. 2 the hose-spreader of the coupling member is shown removed. Fig. 3 is a side elevation of the hose-spreader of the coupling member. Fig. 4 is a transverse section on line 4 4, Fig. 2, looking in the direction indicated by the arrow. Fig. 5 is a perspective view of the coupling-engaging end of the hose.

The hose-coupling member illustrated in Figs. 1, 2, and 3 of the drawings comprises an annular cast-metal shell A.

The shell A is provided at the hose-receiving end of the coupling member with an internal annular rib or enlargement 10. The shell A is provided at its opposite end and externally with screw-threads $a$ for engaging with corresponding screw-threads formed upon and internally of a companion hose-coupling member. (Not shown.)

The shell A is provided internally between the ends of the coupling member and preferably in suitable proximity to the screw-threaded end of the coupling member with an annular shoulder 12, which faces the hose-receiving end of the coupling member, and the surrounding wall 13 of the bore in the shell A between the said shoulder and the internal rib or enlargement 10 flares toward the said shoulder.

B represents the hose, which in Fig. 1 is shown extending into the bore in the shell A at the hose-receiving end of the coupling member and held tightly against the wall 13 by a hose-spreader C, which consists, preferably, of an externally-screw-threaded annular cast-metal shell inserted within the shell A from the threaded end of the coupling member and tapering externally toward its inner end.

The screw-threads $c$ of the hose-spreader C engage with corresponding screw-threads 15, formed upon laterally-projecting lugs 14, with which the surrounding wall 13 of the flaring portion of the bore in the shell A is provided at suitable intervals circumferentially of the coupling member. The shell A is preferably provided with three lugs 14, spaced equidistantly circumferentially of the coupling member. The lugs 14 engage slots $b$, formed in the hose B.

The coupling-engaging end of the hose B is provided with as many slots $b$ as there are lugs 14 formed on the shell A, which slots are equidistantly spaced circumferentially of the hose-coupling and open at the free extremity of the said end of the hose, as shown in Fig. 5—that is, the slots $b$ extend inwardly from the said extremity of the hose and are enlarged, as at 16, circumferentially of the hose a suitable distance from the said extremity of the hose, and the lugs are enlarged, as at 17, circumferentially of the coupling member and occupy the enlarged portions 16 of the slots $b$. (See Figs. 2 and 4.)

In assembling the parts the hose B is introduced into the coupling member at the hose-receiving end of the coupling member as far as the shoulder 12 and is arranged with its slots $b$ opposite the different lugs 14, respectively, whereupon the hose-spreader C is introduced at the opposite end of the coupling member and screwed into engagement with the screw-threads on the said lugs. During the last-mentioned operation the coupling-engaging end of the hose is tightly forced or spread outwardly against the wall 13 of the shell A and is caused to closely embrace or hug the lugs 14, and the rib or enlargement 10 becomes embedded in the exterior of the hose.

The parts are readily assembled and when assembled and relatively secured in place a fluid-tight joint is not only formed between the hose and the coupling, but loosening or displacement of the hose relative to the coupling is positively prevented. It will be observed also that drilling and threading of holes and the employment of set-screws or other costly and unreliable means to hold the parts together are avoided, and consequently the construction is simple and inexpensive.

By the construction hereinbefore described it will be observed that opposite side walls of each circumferentially-enlarged portion of a slot $b$ in the hose B are arranged at opposite sides, respectively, of an enlarged portion of a lug 14 of the coupling member; but I would here remark that my invention not only embraces the connection of a hose to a hose-coupling by means of slots which are formed in the hose and have oppositely-arranged walls which extend circumferentially of the hose and are engaged by lugs formed on the coupling and projecting between the said walls, but broadly covers a connection between the hose and the engaging coupling member by means of slots formed in the hose and engaging lugs formed in the coupling member with the contour and relative arrangement of the mutually-engaging lugs and slots such as to prevent endwise displacement of the hose from the lugs.

What I claim is—

1. In combination, a hose-coupling member comprising an annular cast-metal shell provided interiorly and between its ends with lugs equidistantly spaced circumferentially of the coupling member; a hose extending into the said shell from the hose-receiving end of the coupling member and provided with slots having walls which face the said end of the coupling member and are engaged by the lugs, and a hose-spreader consisting of an externally-screw-threaded annular cast-metal shell engaging with corresponding screw-threads formed on the lugs.

2. In combination, a hose-coupling member comprising an annular cast-metal shell provided between its ends with lugs spaced circumferentially of the coupling member; a hose connected with the said shell and provided with slots engaged by the lugs, with the contour and relative arrangement of the mutually-engaging lugs and slots such as to prevent endwise displacement of the hose from the lugs, and a screw-threaded annular cast-metal shell engaging with corresponding screw-threads formed on the lugs.

3. In combination, a hose-coupling member comprising an annular shell provided interiorly with lugs spaced circumferentially of the coupling member; a hose extending into the said shell from the hose-receiving end of the coupling member and provided with slots engaged by the lugs, which slots extend inwardly from the free extremity of the said end of the hose, and an externally-screw-threaded annular shell engaging with corresponding screw-threads formed on the lugs, and the slots being wider circumferentially of the hose a suitable distance from the free extremity of the hose than at the said extremity, with the wider portions of the slots engaged by enlarged portions of the lugs.

4. In combination, a hose-coupling member comprising an annular shell provided with lugs spaced circumferentially of the coupling member; a hose connected with the said shell and provided with slots engaged by the lugs, and a screw-threaded annular shell engaging with corresponding screw-threads formed on the lugs, and the slots being wider circumferentially of the hose a suitable distance from the free extremity of the hose than at the said extremity, with the wider portions of the slots snugly occupied by the lugs.

5. In combination, a hose-coupling member comprising an annular shell provided interiorly with lugs spaced circumferentially of the coupling member; a hose extending into the said shell from the hose-receiving end of the coupling member and provided with slots engaged by the lugs, and an externally-screw-threaded annular shell engaging with corresponding screw-threads formed on the lugs, and the slots having enlargements circumferentially of the hose a suitable distance from the free extremity of the hose with the said enlargements of the slots engaged by enlargements of the lugs.

6. In combination, a hose-coupling member comprising an annular shell provided with lugs spaced circumferentially of the coupling member; a hose connected with the said shell and provided with slots engaged by the lugs, and an annular screw-threaded shell engaging with corresponding screw-threads formed on the lugs, and the slots having enlargements circumferentially of the hose a suitable distance from the free extremity of the hose, with the said enlargements of the slots engaged by enlargements of the lugs.

7. In combination, a hose-coupling member comprising an annular shell provided interiorly with lugs spaced circumferentially of the coupling member; a hose extending into the said shell from the hose-receiving end of the coupling member and provided with slots engaged by the lugs, which slots have enlargements circumferentially of the hose a suitable distance from the free extremity of the hose, with the enlarged portions of the slots engaged by enlarged portions of the lugs, and means for spreading the hose against the surrounding wall of the bore in the aforesaid shell.

8. In combination, a hose-coupling member comprising an annular shell provided with lugs spaced circumferentially of the coupling member; a hose connected with the said shell and provided with slots engaged by the lugs, which slots are enlarged circumferentially of the hose a suitable distance from the free extremity of the hose, with the enlarged portions of the slots engaged by enlarged portions of the lugs, and means for causing the hose to tightly engage the aforesaid shell circumferentially of the shell.

9. In combination, a hose-coupling member comprising an annular shell provided interiorly with lugs spaced circumferentially of the coupling member; a hose extending into the said shell from the hose-receiving end of the coupling member and provided with slots engaged by the lugs, with the contour and relative arrangement of the mutually-engaging lugs and slots such as to prevent endwise displacement of the hose from the lugs, and means for spreading the hose against the surrounding wall of the bore in the aforesaid shell.

10. In combination, a hose-coupling member comprising an annular shell provided with lugs spaced circumferentially of the coupling member; a hose connected with the said shell and provided with slots engaged by the lugs, with the contour and relative arrangement of the mutually-engaging lugs and slots such as to prevent endwise displacement of the hose from the lugs, and means for tightly holding the hose against the aforesaid shell circumferentially of the shell.

11. In combination, a hose-coupling member comprising an annular shell screw-threaded at one end and having an internal annular rib or enlargement at its other end, which shell is provided interiorly between its ends with lugs spaced circumferentially of the coupling member and has an internal annular shoulder arranged between the aforesaid threaded end and the lugs and facing in the direction of the hose-receiving end of the coupling member; a hose extending into the said shell from the last-mentioned end of the coupling member and provided with slots engaged by the lugs, and means for spreading the hose against the surrounding wall of the bore in the said shell, and the contour and relative arrangement of the mutually-engaging lugs and slots being such as to prevent endwise displacement of the hose from the lugs.

12. In combination, a hose-coupling member comprising an annular shell provided internally with an annular shoulder facing the hose-receiving end of the coupling member, which shell is provided interiorly between the said end and the shoulder with a lug arranged a suitable distance from the shoulder; a hose extending into the said shell from the hose-receiving end of the coupling member and provided with a slot engaged by the lug, and means for spreading the hose against the surrounding wall of the bore in the aforesaid shell, and the contour and relative arrangement of the mutually-engaging lug and slot being such as to prevent endwise displacement of the hose from the lug.

13. In combination, a hose-coupling member comprising an annular shell provided interiorly with a lug; a hose extending into the said shell from the hose-receiving end of the coupling member and provided with a slot engaged by the lug, which slot is widened or enlarged circumferentially of the hose a suitable distance from the free extremity of the hose with the wider portion of the slot snugly occupied by a portion of the lug, and means for spreading the hose against the surrounding wall of the bore in the aforesaid shell.

14. In combination, a hose-coupling member comprising an annular shell provided with a lug; a hose connected with the shell and provided with a slot engaged by the lug, which slot is widened or enlarged circumferentially of the hose a suitable distance from the free extremity of the hose with the wider portion of the slot snugly occupied by a portion of the lug, and means for causing the hose to tightly hug the aforesaid shell circumferentially of the shell.

15. In combination, a hose-coupling member comprising an annular shell provided with a lug; a hose connected with the shell and provided with a slot engaged by the lug, with such a contour and relative arrangement of the mutually-engaging lug and slot as to prevent endwise displacement of the hose from the lug, and means for causing the hose to tightly engage the aforesaid shell circumferentially of the shell.

In testimony whereof I sign the foregoing specification in the presence of two witnesses.

CHRISTIAN GOTTWALD.

Witnesses:
C. H. DORER,
B. C. BROWN.